US 6,741,928 B2

(12) United States Patent
Millington et al.

(10) Patent No.: US 6,741,928 B2
(45) Date of Patent: May 25, 2004

(54) NAVIGATION SYSTEM WITH FIGURE OF MERIT DETERMINATION

(75) Inventors: Jeffrey Alan Millington, Rochester Hills, MI (US); Larry E. Spencer, Lake Orion, MI (US)

(73) Assignee: Magellan DIS, Inc., Rochester Hills, MI (US)

( * ) Notice: Subject to any disclaimer, the term of this patent is extended or adjusted under 35 U.S.C. 154(b) by 0 days.

(21) Appl. No.: 09/799,876

(22) Filed: Mar. 6, 2001

(65) Prior Publication Data

US 2003/0023370 A1 Jan. 30, 2003

Related U.S. Application Data

(60) Provisional application No. 60/187,551, filed on Mar. 7, 2000.

(51) Int. Cl.[7] .............................................. G01C 21/00
(52) U.S. Cl. ...................... 701/209; 701/211; 340/988; 340/995; 342/450; 342/357
(58) Field of Search ................. 701/209, 210, 701/211, 214, 216, 217, 224, 208, 212, 215, 220; 340/988, 995, 990, 989; 342/450, 451, 457, 557

(56) References Cited

U.S. PATENT DOCUMENTS

| | | |
|---|---|---|
| 4,086,632 A | 4/1978 | Lions |
| 4,914,571 A | 4/1990 | Baratz et al. |
| 4,940,925 A | 7/1990 | Wand et al. |
| 4,984,168 A | 1/1991 | Neukrichner et al. |
| 4,991,204 A | 2/1991 | Yamamoto et al. |
| 5,043,908 A | 8/1991 | Manduley et al. |
| 5,220,507 A | 6/1993 | Kirson |
| 5,243,528 A | 9/1993 | Lefebvre |
| 5,262,775 A | 11/1993 | Tamai et al. |
| 5,303,159 A | 4/1994 | Tamai et al. |
| 5,311,434 A | 5/1994 | Tamai |
| 5,317,566 A | 5/1994 | Joshi |
| 5,508,931 A | * 4/1996 | Snider ........................ 340/988 |
| 5,557,522 A | 9/1996 | Nakayama et al. |
| 5,559,707 A | 9/1996 | DeLorme et al. |
| 5,559,938 A | 9/1996 | Van Roekel et al. |
| 5,592,389 A | 1/1997 | La Rue et al. |
| 5,602,564 A | 2/1997 | Iwamura et al. |
| 5,608,635 A | 3/1997 | Tamai |
| 5,652,706 A | 7/1997 | Morimoto et al. |
| 5,774,073 A | 6/1998 | Maekawa et al. |
| 5,802,492 A | 9/1998 | DeLorme et al. |
| 5,821,880 A | * 10/1998 | Morimoto et al. .......... 340/995 |
| 5,842,146 A | 11/1998 | Shishido |
| 5,845,227 A | 12/1998 | Peterson |
| 5,845,228 A | 12/1998 | Uekawa et al. |
| 5,848,364 A | 12/1998 | Ohashi |

(List continued on next page.)

*Primary Examiner*—Thomas G. Black
*Assistant Examiner*—Tuan C To
(74) *Attorney, Agent, or Firm*—Lowe Hauptman Gilman & Berner, LLP

(57) ABSTRACT

A navigation system switches to a different operational mode based upon a figure of merit determination of the current position solution by the navigation system relative to the map database. If the vehicle navigation system is guiding a driver along a recommended route, and the figure of merit drops below a first predetermined threshold, the navigation system disables an automatic route recalculation routine. If the figure of merit drops below a second predetermined threshold while the vehicle is in route guidance mode, the navigation system displays a textual display of the turn-by-turn instructions along the recommended route to the destination. If the vehicle navigation system is not in a route guidance mode and the figure of merit drops below a third predetermined threshold, the navigation system displays a map of the area surrounding the last current position solution, without displaying the current position of the vehicle.

21 Claims, 3 Drawing Sheets

U.S. PATENT DOCUMENTS

| | | |
|---|---|---|
| 5,852,791 A | 12/1998 | Sato et al. |
| 5,862,509 A | 1/1999 | Desai et al. |
| 5,862,811 A | 1/1999 | Steele |
| 5,892,441 A | 4/1999 | Woolley et al. |
| 5,911,775 A * | 6/1999 | Tanimoto .................. 701/210 |
| 6,047,235 A * | 4/2000 | Hiyokawa et al. .......... 701/201 |
| 6,308,134 B1 * | 10/2001 | Croyle et al. ............... 701/220 |
| 6,320,517 B1 * | 11/2001 | Yano et al. ................. 340/995 |
| 6,381,536 B1 * | 4/2002 | Satoh et al. ................ 701/208 |
| 6,453,235 B1 * | 9/2002 | Endo et al. ................. 701/211 |

\* cited by examiner

NAVIGATION SYSTEM WITH FIGURE OF MERIT DETERMINATION

This application claims priority from provisional application serial No. 60/187,551 filed Mar. 7, 2000.

BACKGROUND OF THE INVENTION

The present invention relates generally to navigation systems and more particularly to a navigation system which changes its operational mode based upon a figure of merit determination for its current position solution.

Known vehicle navigation systems include a plurality of sensors which determine the position of the vehicle relative to a map database of roads. The navigation system also generally includes a user interface, such that the user can select a destination relative to the database of roads. The navigation system calculates a recommended route from the current position to the selected destination and communicates the recommended route to the driver with turn-by-turn instructions.

As the driver guides the vehicle along the recommended route toward the destination, the vehicle navigation system continuously calculates the position of the vehicle relative to the map database. The vehicle navigation system displays the current position of the vehicle on a map display. Turn-by-turn instructions to the driver are generated based upon the current position of the vehicle relative to the route, i.e., a predetermined distance from the next turn. If the driver drives the vehicle off of the recommended route, the vehicle navigation system automatically recalculates a new route from the current position of the vehicle to the destination.

The accuracy of the position of the vehicle relative to the map database as determined by the vehicle navigation system fluctuates. As is well known, a position solution from a GPS receiver may be in error up to 100 meters. Further, if GPS signals are temporarily unavailable, the error of the vehicle navigation system position solution relative to the map database could be even larger.

This presents several problems for the vehicle navigation system. First, if the vehicle navigation system erroneously determines that the vehicle is off the recommended route, the navigation system will recalculate a new route from the erroneous new current position of the vehicle. Further, turn-by-turn instructions to the driver will be generated at the wrong time, or the wrong instructions will be generated, if the navigation system calculates an erroneous position on the recommended route.

SUMMARY OF THE INVENTION

The navigation system of the present invention changes its operational mode based upon a figure of merit determination. The figure of merit determination is a quantification of the level of confidence or level of certainty of the current position solution of the navigation system.

If the figure of merit exceeds a predetermined threshold, the navigation system operates normally. The navigation system treats the current position solution as accurate and, based upon the current position solution, generates turn-by-turn instructions and automatically recalculates new routes as necessary.

If the figure of merit drops below a first predetermined threshold while in route guidance mode, the navigation system will automatically disable the automatic route recalculation. Then, if the current position solution indicates that the vehicle has deviated from the recommended route, the navigation system will not automatically recalculate the new route from the current position solution to the destination. Rather, the navigation system will display a map with the recommended route highlighted and the vehicle on the map at the current position solution. The user can manually indicate to the navigation system that a new route should be calculated. Since the figure of merit is below a first predetermined threshold, the level of certainty that the vehicle has actually deviated from the recommended route is insufficient to warrant recalculating the route.

If the figure of merit drops below a second predetermined threshold while the vehicle is in a route guidance mode, the vehicle navigation system enters a second operational mode. In the second operational mode, a list of the remaining turn-by-turn instructions to the destination along the recommended route is displayed to the driver. In this second operational mode, although the navigational system does not provide a current vehicle position solution, the driver can follow the turn-by-turn instructions on the display until a position solution which exceeds the second predetermined threshold is obtained.

If the figure of merit drops below a third predetermined threshold, the navigation system enters a third operational mode in which a map of the surrounding area surrounding the last position solution is displayed. Thus, although the navigation system is temporarily unable to indicate the present position of the vehicle relative to the map database, the navigation system displays a map of the surrounding area for the user to view. The user can use the map to navigate the vehicle until a position solution having a figure of merit exceeding the third predetermined threshold is obtained. The vehicle navigation system will switch to the third operational mode if the figure of merit drops below the third predetermined threshold while the vehicle navigation system is not in a route guidance mode, i.e., the user has not selected a destination and there is no recommended route or turn-by-turn instructions.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF A PREFERRED EMBODIMENT

Figure 1:
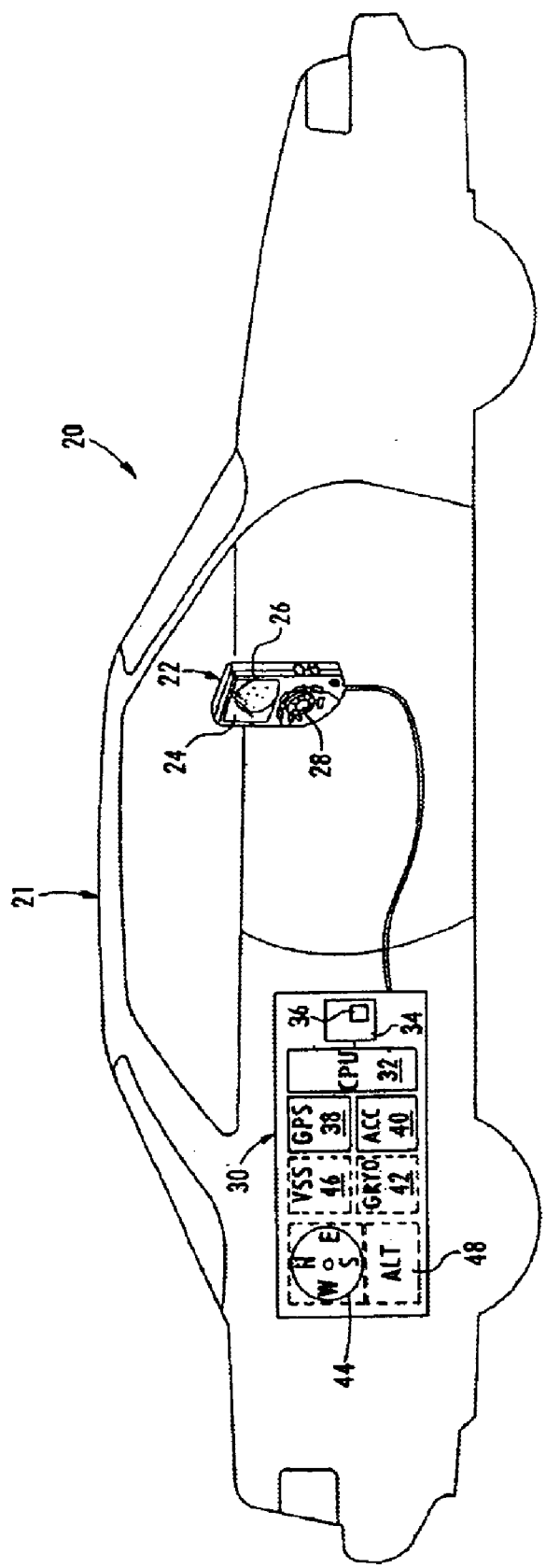
FIG. 1 is a schematic of the navigation system of the present invention installed in a vehicle.

The navigation system 20 of the present invention is shown schematically in FIG. 1 installed in a vehicle 21. The navigation system 20 includes an Operator Interface Module ("OIM") 22 including input and output devices. The OIM 22 includes a display 24, such as a high resolution LCD or flat panel display, and an audio speaker 26. The OIM 22 also includes input devices 28, preferably a plurality of buttons and directional keypad, but alternatively including a mouse, keyboard, keypad, remote device or microphone. Alternatively, the display 24 can be a touch screen display.

The navigation system 20 further includes a computer module 30 connected to the OIM 22. The computer module 30 includes a CPU 32 and storage device 34 connected to the CPU 32. The storage device 34 may include a hard drive, CD ROM, DVD, RAM, ROM or other optically readable storage, magnetic storage or integrated circuit. The storage device 34 contains a database 36 including a map of all the roads in the area to be traveled by the vehicle 21 as well as the locations of potential destinations, such as addresses, hotels, restaurants, or previously stored locations. The software for the CPU 32, including the graphical user interface, route guidance, operating system, position-determining software, etc. may also be stored in storage device 34 or alternatively in ROM, RAM or flash memory.

The computer module 30 preferably includes navigation sensors, such as a GPS receiver 38 and an inertial sensor, which is preferably a multi-axis accelerometer 40. The computer module 30 may alternatively or additionally include one or more gyros 42, a compass 44, a wheel speed sensor 46 and altimeter 48, all connected to the CPU 32. Such position and motion determining devices (as well as others) are well known and are commercially available. The navigation system 20 propagates the position of the vehicle 21 relative to the map database 36, i.e. relative positions on road segments and intersections ("nodes"). The navigation system 20 also determines the current location of the vehicle 21 in terms of latitude and longitude. Utilizing any of a variety of known techniques, the position of the vehicle 21 relative to the map database 36 and/or in terms of latitude and longitude is determined at least in part based upon the motion signals from the multi-axis accelerometer 40. The current local time and date can be determined from the GPS signals received by the GPS receiver 38.

Generally, the CPU 32 and position and motion determining devices determine the position of the vehicle 21 relative to the database 36 of roads utilizing dead reckoning, map-matching, etc. Further, as is known in navigation systems, the user can select a destination relative to the database 36 of roads utilizing the input device 28 and the display 24. The navigation system 20 then calculates and displays a recommended route directing the driver of the vehicle 21 to the desired destination. Preferably, the navigation system 20 displays turn-by-turn instructions on display 24 and gives corresponding audible instructions on audio speaker 26, guiding the driver to the desired destination.

The CPU 32 also calculates a figure of merit for the current position solution. The figure of merit determination is an attempted quantification of the level of confidence, level of certainty or level of accuracy of the current position solution of the navigation system. Depending upon the method used for calculating a figure of merit, a lower figure of merit value may correspond to a higher confidence level in the accuracy of the current position solution or lower confidence level. For simplicity, the figure of merit will be described here as increasing with confidence or accuracy. The figure of merit value can be determined in any of several known ways. A figure of merit may be determined by comparing a dead-reckoned path with a map-matched position or the shape of the road in the map database. The failure of the dead-reckoned path to match the map may indicate that the position solution is incorrect. The figure of merit may be based upon the angular variation between the dead-reckoned path and the road in the map database.

Figure 2:
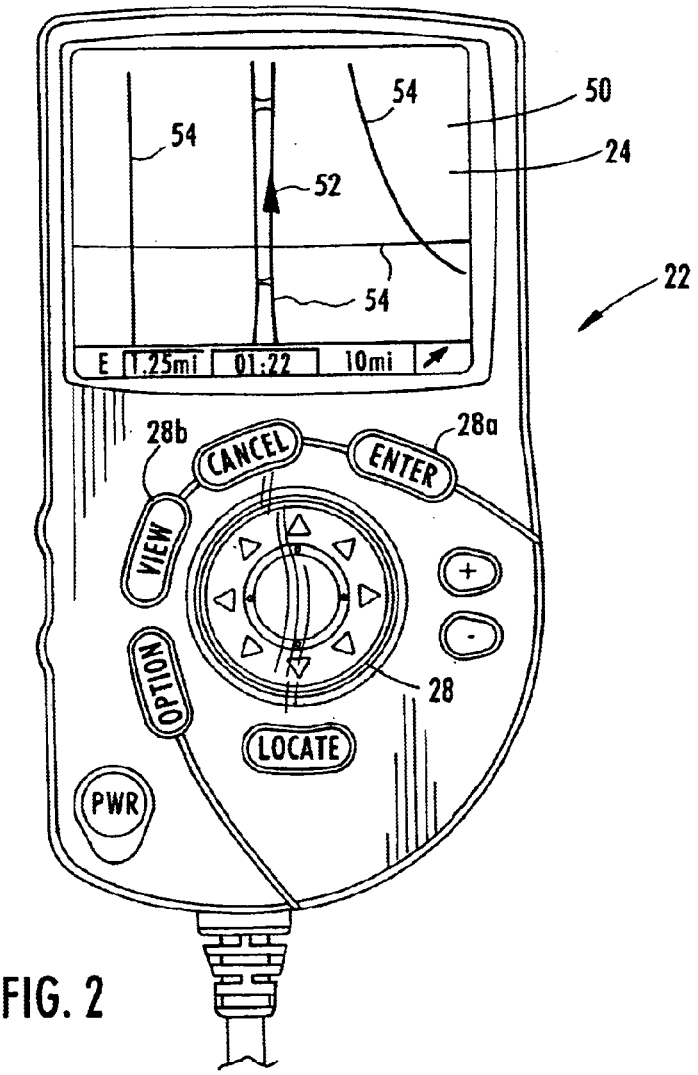
FIG. 2 is the OIM of FIG. 1 showing a map display.

FIG. 2 illustrates the OIM 22 of FIG. 1. As can be seen in FIG. 2, the input devices 28 include an "enter" key 28a. In FIG. 2, the display 24 is in a map display mode displaying a map screen 50, including a vehicle icon 52 representing the current position of the vehicle 21 on roads 54. In FIG. 2, the navigation system 20 is in a normal operational mode because the figure of merit exceeds a first predetermined threshold. Since the level of confidence in the accuracy of the position solution is sufficient, the navigation system 20 displays the current position by displaying the vehicle icon 52 relative to the roads 54 on display 24. The map display screen 50 of FIG. 2 is normally displayed with the heading of the vehicle icon 52 directed upwards (or North up, based upon user preference), with the map of roads 54 moving and rotating based upon movement of the vehicle 21. The map display screen 50 is displayed when the vehicle navigation system 20 is not in route guidance mode and at times when the vehicle navigation system 20 is in route guidance mode.

Figure 3:
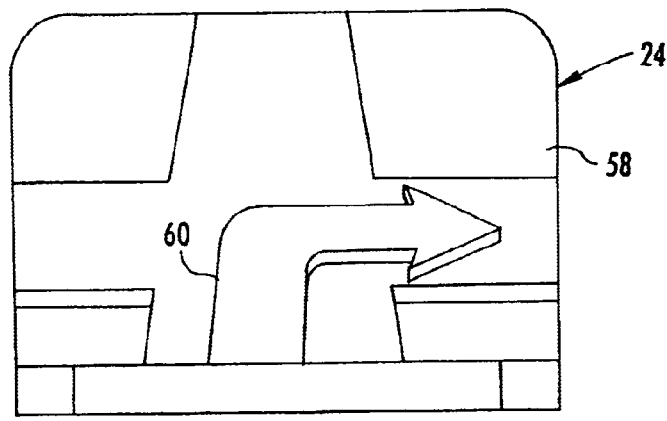
FIG. 3 is the display of FIG. 2 displaying a maneuver instruction.

Referring to FIG. 3, if the vehicle navigation system 20 is in route guidance mode, i.e., it is guiding a driver to a destination, the display 24 switches from the map display screen 50 (FIG. 1) to a maneuver instruction screen 58 on display 24 when approaching a maneuver. Maneuver instruction screen 58 includes the maneuver instruction 60, such as a turn arrow, as shown. The maneuver instruction 60 indicates to the driver the next maneuver to be performed along the recommended route to the destination. The maneuver instruction screen 58 is only displayed when the navigation system 20 is in route guidance mode and the figure of merit exceeds a second predetermined threshold.

Figure 4:
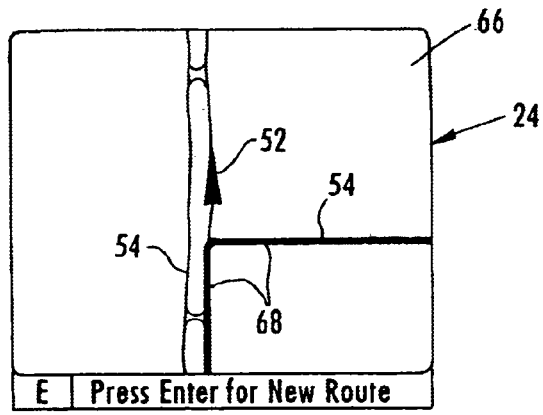
FIG. 4 illustrates the display of FIG. 2 where the vehicle has deviated from the recommended route.

FIG. 4 illustrates the display 24 again illustrating a map display screen 66 including the vehicle icon 52 and roads 54, where some of the roads 54 are highlighted, representing the recommended route 68. In FIG. 4, the current position of the vehicle icon 52 is off of the recommended route. As a result, if the figure of merit of the current position solution exceeds a third predetermined threshold, then the vehicle navigation system 20 will calculate a new route to the destination from the current position (represented by the vehicle icon 52).

On the other hand, if the figure of merit is below the third predetermined threshold, then the display 24 will continue to display the vehicle icon 52 at the calculated current position solution and the highlight a recommended route 68. Since the figure of merit is below the third predetermined threshold, the navigation system 20 does not calculate a new route to the destination from the current position solution. The user can manually generate a new route by pressing the "enter" key (FIG. 2).

Figure 5:
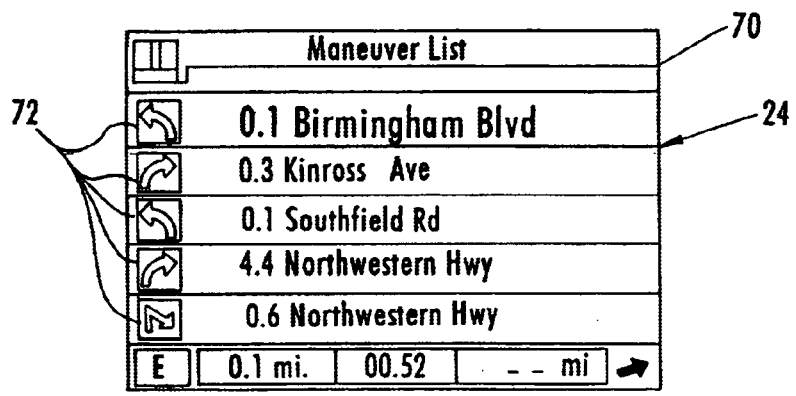
FIG. 5 illustrates the display of FIG. 2 displaying textual maneuver instructions for the recommended route.

Referring to FIG. 5, if the figure of merit falls below a fourth predetermined threshold less than the third predetermined threshold while the vehicle navigation system 20 is in route guidance mode, the display 24 will display a maneuver list screen 70 comprising a list of textual descriptions 72, each representing a maneuver along the recommended route. In this manner, the driver can guide the vehicle 21 along the recommended route even though the vehicle navigation system 20 can no longer provide turn-by-turn instructions because the current position solution is likely inaccurate. Alternatively, the maneuver list screen 70 may be displayed instead of the display screen 66 of FIG. 4.

Figure 6:
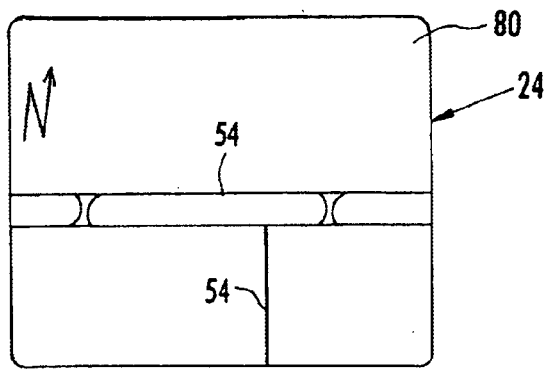
FIG. 6 illustrates the display of FIG. 2 showing a map of the surrounding area without a vehicle icon.

Referring to FIG. 6, if the figure of merit drops below a fifth predetermined threshold while the vehicle navigation system 20 is not in route guidance mode, the display 24 simply displays a map display screen 80 including roads 54 and without the vehicle icon 52. The map display screen 80 includes a predetermined area surrounding the last known accurate position solution of the vehicle navigation system 20. Further, rather than displaying the map display screen 80 with the vehicle heading up, the map display screen 80 is displayed with north up. In this manner, even though the navigation system 20 can no longer indicate accurately the current position of the vehicle relative to the roads 54, at least the driver can view a map 80 of the surrounding area. Thus, the driver may still be able to utilize the map display screen 80 to guide the vehicle 21 until the navigation system 20 can obtain a current position solution with a figure of merit exceeding a fifth predetermined threshold.

Although the predetermined thresholds have been designated first through fifth above, it should be recognized that they could all be equal. It is also possible for the user to selectively manually switch between or among several of the display modes described above. For example, the user can manually change the display mode between map screen 50 (FIG. 2), maneuver instruction screen 58 (FIG. 3) and maneuver list screen 70 (FIG. 5) by activating the "view" button 28*b* (FIG. 2). Preferably, the user can also selectively enable or disable the automatic recalculation feature of FIG. 4 in a user accessible menu.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A method for operating a vehicle navigation system including the steps of:
   a) calculating a current position solution;
   b) calculating a figure of merit of the current position solution; and
   c) changing an operational mode based upon the figure of merit when the figure of merit drops below a predetermined threshold,
   wherein said step c) further includes the step of disabling an automatic route recalculation based upon the figure of merit, and
   wherein said c) further including the step of disabling automatic route recalculation when the figure of merit drops below a predetermined threshold.

2. The method of claim 1 further including the step of calculating a recommended route to a destination.

3. The method of claim 2 further including the step of displaying textual instructions along the recommended route based upon the figure of merit.

4. The method of claim 3 further including the steps of switching from a map display mode to a textual turn-by-turn display mode based upon the figure of merit.

5. The method of claim 1 further including the step of switching from a vehicle heading up display to a north up display based upon the figure of merit.

6. The method of claim 1 further including the step of switching from a map display to a turn-by-turn display based upon the figure of merit.

7. The method of claim 1 wherein said navigation system switches between a turn-by-turn route guidance mode and a maneuver list mode in which said display displays a textual list of a plurality of maneuvers in the recommended route based upon the figure of merit.

8. The method of claim 1 further including the steps of switching from a map display mode to textural turn-by-turn display mode based upon the figure of merit.

9. A navigation system comprising:
   at least one navigation sensor generating a position signal;
   a processor determining a current position based upon the position signal, said processor determining a figure of merit of the current position, said processor changing an operational mode of the navigation system based upon the figure of merit when said processor determines that the figure of merit has dropped below a predetermined threshold,
   including a display, said display including a plurality of display modes, said navigation system changing said display modes based upon said figure of merit,
   wherein said navigation system switches between a turn-by-turn route guidance mode and a maneuver list mode in which said display displays a textual list of a plurality of maneuvers in the recommended route based upon the figure of merit.

10. The navigation system of claim 9 wherein the navigation system changes an output mode based upon the figure of merit.

11. The navigation system of claim 9 further including:
   a user input device permitting a user to select a destination;
   said processor calculating a recommended route to the destination, said processor including an automatic route recalculation mode in which a new route to the destination is calculated based upon the processor determining that the current position is no longer on the recommended route, said processor disabling said automatic route recalculation based upon said figure of merit.

12. The navigation system of claim 11 wherein said display switches between displaying the current position on a map and displaying the map without the current position based upon the figure of merit.

13. The navigation system of claim 9 wherein said navigation system switches between a turn-by-turn route guidance mode and a maneuver list mode in which said display displays a textual list of a plurality of maneuvers in the recommended route based upon the figure of merit.

14. A method of operating a vehicle navigation system including the steps of:
   a) calculating a current position;
   b) determining a confidence level in the current position;
   c) disabling an automatic route recalculation based upon the figure of merit; and
   d) changing an operational mode based upon the figure of merit when the figure of merit drops below a predetermined threshold.

15. The method of claim 14 further including the steps of:
   selecting a destination and calculating a recommended route to the destination before said step c); and
   determining that the current position is not on the recommended route.

16. The method of claim 14 further including the steps of:
   selecting a destination and calculating a recommended route to the destination before said step c);
   determining that the current position is not on the recommended route before said step c); and
   automatically calculating a new recommended route to the destination before said step c).

17. The method of claim 14 wherein said navigation system switches between a turn-by-turn route guidance mode and a maneuver list mode in which said display displays a textual list of a plurality of maneuvers in the recommended route based upon the figure of merit.

18. A method for operating a vehicle navigation system including the steps of:
   a) calculating a current position solution;
   b) calculating a figure of merit of the current position solution; and
   c) changing an operational mode based upon the figure of merit when the figure of merit drops below a predetermined threshold,
   wherein said step c) further includes the step of disabling an automatic route recalculation based upon the figure of merit, and
   wherein said step c) further including the step of disabling automatic route recalculation when the figure of merit drops below a predetermined threshold,
   wherein at least one navigation sensor generation a position signal;
   a processor determining a current position based upon the position signal, said processor determining a figure of merit of the current position, said processor changing an operational mode of the navigation system based upon the figure of merit when said processor determines that the figure of merit has dropped below a predetermined threshold,
   including a display, said display including a plurality of display modes, said navigation system changing said display modes based upon said figure of merit,
   wherein said navigation system switches between a turn-by-turn route guidance mode and a maneuver list mode in which said display displays a textual list of plurality of maneuvers in the recommended route based upon the figure of merit,
   wherein further including the step of calculating a recommended route to a destination and further including the step of displaying textual instructions along the recommended route based upon the figure of merit.

19. A method for operating a vehicle navigation system including the steps of:
   a) calculating a current position solution;
   b) calculating a figure of merit of the current position solution; and
   c) changing an operational mode based upon the figure of merit when the figure of merit drops below a predetermined threshold,
   wherein said step c) further includes the step of disabling an automatic route recalculation based upon the figure of merit, and
   wherein said step of c) further including the step of disabling automatic route recalculation when the figure of merit drops below a predetermined threshold,
   further including the step of calculating a recommended route to a destination,
   further including the step of displaying textual instructions also the recommended route based upon the figure of merit.

20. A method for operating a vehicle navigation system including the steps of:
   a) calculating a current position solution;
   b) calculating a figure of merit of the current position solution; and
   c) changing an operational mode based upon the figure of merit when the figure of merit drops below a predetermined threshold,
   wherein said step c) further includes the step of disabling an automatic route recalculation based upon the figure of merit, and
   wherein said step c) further including the step of disabling automatic route recalculation when the figure of merit drops below a predetermined threshold,
   further including the step of displaying textual instructions along the recommended route based upon the figure of merit.

21. The method of claim 20, further including the steps of switching from a map display mode to a textual turn-by-turn display mode based upon the figure of merit.

* * * * *